Patented July 5, 1949

2,474,808

UNITED STATES PATENT OFFICE 2,474,808

PREPARATION OF VINYL SULFONES

Dwight L. Schoene, Naugatuck, Conn., assignor to United States Rubber Company, New York, N. Y., a corporation of New Jersey No Drawing. Application January 10, 1947, Serial No. 721,479

10 Claims. (Cl. 260—607)

This invention relates to an improved method of preparation of vinyl sulfones.

Vinyl sulfones are known to be extremely reactive chemicals of potential value as intermediates in the production of a number of valuable chemicals. However, difficulties in preparation have limited their use. The recorded syntheses to date have involved toxic intermediates or have made use of reactants which are potentially explosive. One procedure involves the oxidation of the highly obnoxious beta-chloroethyl sulfides followed by dehydrochlorination. Another procedure involves the oxidation of vinyl sulfides which in turn are derived from the reaction of mercaptans with acetylene under pressure. Such reactions require considerable precautions in order to avoid the explosions which often occur with acetylene under pressure. My new method of synthesis eliminates these disadvantages and permits the preparation of vinyl sulfones with a minimum of hazard.

I have found that beta-hydroxyethyl sulfones may be converted to the corresponding vinyl compounds by subjecting them to pyrolytic conditions. In carrying out the new synthesis, the beta-hydroxyethyl sulfones, or the carboxylic acid esters thereof, such as the alkanoic esters, viz. the beta-alkylcarboxyl-oxyethyl sulfones, having the general formula

R—SO$_2$—CH$_2$CH$_2$O—X, where R is an alkyl, cycloalkyl, alkenyl, aryl, or aralkyl radical or the group —CH$_2$—CH$_2$—X and where X is hydrogen or an alkyl carbonyl group, are introduced into a heated chamber, preferably containing a contact agent, which may or may not have a catalytic action. The heated chamber is preferably so equipped that the pyrolysate may be withdrawn at about the same rate as the addition. This treatment converts at least a portion of the starting sulfone to R—SO$_2$CH=CH$_2$ and HOX which are withdrawn along with any unreacted starting material. The vinyl sulfone and the HOX (water or organic acid) portion are separated from the parent compound by distillation or crystallization and the unreacted starting material is recirculated for further pyrolysis. As illustrative, when R is ethyl and X is hydrogen, as in ethyl-beta-hydroxyethyl sulfone, pyrolysis gives ethyl vinyl sulfone and water. When R is methyl and X is as alkyl carbonyl group, for example acetyl as in methyl-beta-acetoxyethel sulfone, pyrolysis gives methyl vinyl sulfone and the alkanoic acid, acetic acid. Similarly, bis(beta-hydroxyethyl) sulfone or bis (beta-acetoxyethyl) sulfone yield vinyl sulfone on pyrolysis. By varying the R group of the beta-hydroxyethyl or beta-alkylcarbonyl-oxethyl sulfone, the following are representative of the vinyl sulfones producible by pyrolysis: vinyl sulfone, methyl vinyl sulfone, ethyl vinyl sulfone, n-propyl vinyl sulfone, isopropyl vinyl sulfone, allyl vinyl sulfone, n-butyl vinyl sulfone, 2-butenyl vinyl sulfone, secondary butyl vinyl sulfone, t-butyl vinyl sulfone, n-amyl vinyl sulfone, isoamyl vinyl sulfone, cyclohexal vinyl sulfone, octyl vinyl sulfone, dodecyl vinyl sulfone, octadecenyl vinyl sulfone, octadecyl vinyl sulfone, phenyl vinyl sulfone, p-chlorophenyl vinyl sulfone, p-tolyl vinyl sulfone, naphthyl vinyl sulfone, phenethyl vinyl sulfone, benzyl vinyl sulfone.

In general, I prefer to conduct the pyrolysis at reduced pressures of the order of 1 to 100 mm. of mercury since this provides a more convenient means of removing the pyrolysates. Atmospheric or superatmospheric pressures may be employed as well, if desired, at a somewhat greater loss due to carbonization. Depending upon the contact agent used, pyrolysis temperatures may vary from about 150° C. to about 600° C. In the presence of a contact agent such as alumina which is an effective catalyst, pyrolysis occurs at temperatures as low as about 150° C. although the reaction is more rapid and complete at a temperature of about 200° C. More efficient use of the catalyst is obtained by preheating the sulfone. With a relatively inert material such as glass in the pyrolysis chamber, temperatures of 400–600 C. are satisfactory with the higher temperatures giving faster rates. Many other catalysts or heat transfer agents may be used such as silica, carborundum, aluminum and other metals, graphite, quartz chips, titania and the like.

The following examples are illustrative of the invention:

*Example I*

A three-neck, round bottom, 500 ml. flask is partially immersed in a metal bath maintained at 240° C. and charged with 150 g. of 4–8 mesh alumina. The flask is equipped with a dropping funnel, an inlet tube for nitrogen and a lagged 10 x 0.5 inch Vigreaux type column. The system is evacuated to a pressure of 20 mm. mercury and, after preheating the alumina for an hour, 200 g. of beta-acetoxyethyl methyl sulfone is added dropwise over a period of two hours. A slow stream of nitrogen is passed through the system throughout the addition. Shortly after the addition is started the pyrolysate begins to distill through the short column and is collected in an ice-cooled condenser. At the end of the addition, heat and vacuum are maintained for thirty minutes to insure removal of the product from the alumina. The yield of yellow pyrolysate is 164 g., a recovery of 82 percent.

The pyrolysate is distilled at reduced pressure through a short column. The acetic acid fraction is discarded and 93.5 g. of substantially pure methyl vinyl sulfone is collected at 114° C./16 mm. as a colorless oil. Refractive index, $n_D^{25}$ 1.4589. This corresponds to a yield of 72 percent of theory. The residue consisting chiefly of unreacted starting material totals 15 g.

Example II

Using the technique of Example I, 150 g. of beta-hydroxyethyl methyl sulfone is pyrolyzed by dropping it at a rate of 70 drops per minute onto 50 g. of 4–8 mesh alumina maintained at a bath temperature of 250–290° C. The vapor temperature rises to about 97° C./20 mm. and slowly increases to about 170° C./20 mm. which indicates that some of the starting material is distilling along with the pyrolysate. An additional 50 g. of alumina is added and the pyrolysis is continued. The vapor temperature now remains at about 100° C./20 mm. At the end of the reaction, 95 g. of pale yellow oil is collected in the air cooled trap and an additional 25 g. of pyrolysate, largely water, is collected in the dry ice cooled trap. The loss amounts to 30 g.

The oil is distilled through a 10 × 0.5 inch column packed with ¼ inch saddles. A small amount of yellow forerun boiling up to 108° C./12 mm. is discarded and the main fraction is taken at 94° C./7 mm. It consists of 71 g. of methyl vinyl sulfone which corresponds to a yield of 55 percent. The dark, fluid residue totals 17 g.

Example III

A vertical 24 × 0.8 inch Pyrex tube is wrapped with resistance wire as a source of heat and packed to a depth of about 18 inches with 4–8 mesh alumina, and heated under vacuum for 1.5 hours at 300° C. The tube and wrapping are inserted into a slightly larger tube which serves to prevent heat loss. The temperature is then reduced to 260° C. and the dropwise addition of beta-hydroxyethyl methyl sulfone (94 percent purity) is started. The initial pressure is 20 mm. The first pyrolysate is colorless but soon becomes dark brown. The temperature, measured by a thermocouple in an indentation in the pyrolysis tube, is reduced to 230° C. at a pressure of 10 mm. and the pyrolysate becomes light yellow. A still lighter product is obtained at 200–220° C. and the balance of the run is carried out at this temperature. A total of 502 g. of the hydroxy sulfone is added over a period of seven hours. The alumina darkens somewhat, especially at the top where it comes in contact with the liquid hydroxy sulfone, but no appreciable carbonization is observed. The final pyrolysate, collected in an ice cooled receiver, weighs 467 g. which corresponds to a recovery of 92 percent. Distillation yields 306 g. of substantially pure methyl vinyl sulfone leaving a residue of 70 g. which is largely unreacted starting material. Thus the conversion is 74 percent and the yield, corrected for the unreacted residue, is 90 percent of theory.

Example IV

Using the technique of Example III, 310 g. of crude beta-acetoxyethyl methyl sulfone mixed with 50 ml. of glacial acetic acid (to keep the low melting sulfone from crystallizing in the dropping funnel) is pyrolyzed at 200° C./15 mm. Fine alumina dust in the 4–8 mesh alumina used makes a slow addition rate necessary to prevent excessive flooding in the column and some seven hours are required to complete the addition. The pyrolysate, recovered as a light yellow oil, totals 316 g. (88 percent). Distillation through a short packed column yields 134.5 g. of methyl vinyl sulfone boiling at 100–101° C./9 mm., $n_D^{26}$ 1.4594.

Example V

Using the technique of Example III, 128 g. of beta-hydroxyethyl ethyl sulfone is pyrolyzed at 240–260° C./10 mm. A period of four hours is required for the addition. The first pyrolysate is colorless but becomes yellow as the run progresses. Some carbonization is observed on the walls of the Pyrex pyrolysis tube.

The final product weighs 104 g. (81.5 percent). It is distilled through a short packed column at reduced pressure. The water is not condensed and a small amount of yellow forerun is discarded. Two fractions are then taken. One totaling 18 g. is pale yellow and boils at 108° C./10 mm., $n_D^{26}$ 1.4622. The second boils at 106–7° C./9 mm., $n_D^{26}$ 1.4614, weighs 67 g. and is almost colorless. It represents substantially pure ethyl vinyl sulfone while the previous fraction is largely ethyl vinyl sulfone contaminated by a small amount of the yellow forerun. There is very little residue. The total yield based on the two fractions amounts to 77 percent of theory.

Example VI

Using the technique of Example I, 63.5 g. of bis-(beta-acetoxyethyl) sulfone is pyrolyzed using 100 g. of alumina at a bath temperature of 320° C. The dropping rate is 60 per minute and the pressure is maintained at 80–100 mm. An appreciable quantity of gas is formed which does not condense in the water cooled condenser while 42 g. of yellow liquid pyrolysate is collected. Distillation of the product gives 19 g. of acetic acid and 16 g. of slightly yellow vinyl sulfone boiling at 71–72° C./3 mm., $n_D^{25}$ 1.4750. The residue weighs 7 g. and includes both starting material and the half pyrolysate. Redistillation of the vinyl sulfone gives 14.5 g. of colorless vinyl sulfone boiling at 65° C./2 mm. $n_D^{28}$ 1.4740. The material has both lachrymatory and vesicant action.

Example VII

Using the technique of Example I, 200 g. of crude bis-(beta-acetoxyethyl) sulfone is pyrolyzed on 100 g. of 4–8 mesh alumina. The dropping rate is 60 per minute and the initial bath temperature is 330° C. at a pressure of 80–100 mm. This results in the formation of much non-condensable gas along with the liquid pyrolysate. When the temperature is reduced to 280° C. and the pressure to 10–40 mm., the non-condensable gas is no longer formed and a clear yellow pyrolysate distills at a vapor temperature of 125–140° C. The final product weighs 146 g. (73 percent). Distillation of the product gives the following fractions:

1. 70 g. boiling up to 50° C./2 mm. and consisting chiefly of acetic acid.
2. 37 g. of crude vinyl sulfone boiling at 67° C./2 mm.
3. 34 g. of crude beta-acetoxyethyl vinyl sulfone boiling at 135–40° C./2 mm.
4. 6 g. of dark residue consisting chiefly of starting material.

This shows that the yield of the half-pyrolysate can be increased by removing it rapidly from the pyrolysis chamber, i. e. by the use of low pressures which allows entrainment of the beta-acetoxyethyl vinyl sulfone in the more volatile acetic acid and vinyl sulfone.

Example VIII

An 18 mm. inside diameter Pyrex tube is mounted vertically and packed to a depth of 25 cm. with 6 x 6 mm. pieces of Pyrex tubing. The tube is heated to about 540° C. by means of a coil of resistance wire. A slow stream of nitrogen is passed through the tube while 50 g. of bis-(beta-acetoxyethyl) sulfone is added dropwise at the top at the rate of 60 drops per minute at atmospheric pressure. The light yellow pyrolysate is condensed in a water-cooled trap at the bottom of the tube and weighs 41 g. On standing it darkens appreciably. Distillation under reduced pressure gives 18.5 g. of acetic acid and 12.4 g. of substantially pure vinyl sulfone.

Example IX

Using the technique of Example III, 40 g. of bis-(beta-hydroxyethyl) sulfone is pyrolyzed by dropping it through the alumina filled tube heated initially at 300° C. The pressure is maintained at 2-5 mm. After 10 g. is added the product begins to condense in the receiver as a yellow solid, indicating decomposition. The temperature is reduced to 200° C. and the pyrolysate remains almost colorless and only partially crystalline. The bulk of the crystalline material, thioxane-1,1-dioxide, remains in the condenser while the liquid vinyl sulfone collects in the receiver. About one hour is required for the pyrolysis plus another hour during which the tube is heated under vacuum to remove the pyrolysate. The final product contains 11 g. of water, 10 g. of crude vinyl sulfone, $n_D^{18}$ 1.4838, and 8 g. of thioxane-1,1-dioxide. Losses thus are 11 g.

This example shows that two products are possible from the direct pyrolysis of bis-(beta-hydroxyethyl)-sulfone. Thioxane-1,1-dioxide is formed by the elimination of one molecule of water while vinyl sulfone results from the removal of two molecules of water. The thioxane derivative is not formed when the acetate of bis-(beta-hydroxyethyl)-sulfone is pyrolyzed. (Examples VI, VII and VIII.)

Example X

Using the technique of Example III, 223 g. of beta-hydroxyethyl isobutyl sulfone is pyrolyzed at a temperature of 200-220° C./10-15 mm. The addition rate is 50 g. per hour. The pale yellow pyrolysate, comprising an aqueous and an isobutyl sulfone layer, totals 179 g. (81 percent). Distillation through a short packed column gives 146 g. (74 percent of theory) of isobutyl vinyl sulfone boiling at 83-90° C./1 mm. and leaves a 10 g. residue. Redistillation gives 128 g. of substantially pure isobutyl vinyl sulfone boiling at 86° C./1 mm., $n_D^{20}$ 1.4610.

Example XI

Using the technique of Example III, 382 g. of 92.5 percent n-butyl beta-hydroxyethyl sulfone is pyrolyzed at a rate of 70 g. per hour at a temperature of 190-200° C. using a pressure of 2 mm. The pale yellow pyrolysate recovered totals 364 g. (95 percent). Distillation through a short packed column gives 256 g. of colorless, substantially pure n-butyl vinyl sulfone boiling at 80-83° C./1 mm., $n_D^{20}$ 1.4622, and 20 g. of a slightly less pure fraction boiling at the same temperature but with a slight yellow color, $n_D^{20}$ 1.4628. The residue totaled 18 g. The conversion is thus 88 percent and the yield, correcting for the residue, is 93.5 percent.

Example XII

Using the technique of Example III, 70 g. of molten beta-hydroxyethyl phenethyl sulfone is pyrolyzed at a temperature of 250° C. using a pressure of 2-5 mm. The addition rate is 50 g. per hour. The pyrolysate is dark and semi-crystalline. It is dissolved in chloroform, dried over anhydrous magnesium sulfate and the crystals of phenethyl vinyl sulfone precipitated by the addition of petroleum ether (B. P. 30-60° C.). The crystals weigh 21 g., are substantially white and melt at 72° C. Recrystallization from benzene-petroleum ether raises the melting point to 76° C.

Example XIII

Using the technique of Example III, 50 g. of crude beta-hydroxyethyl tolyl sulfone is pyrolyzed at a temperature of 200-230° C. using a pressure of 2 mm. The addition requires one hour. The bulk of the pyrolysate crystallizes at the cool end of the pyrolysis tube and is washed out with benzene. The water formed is not condensed. Evaporation of the benzene solution gives 13 g. of pyrolysate from which 7 g. of p-tolyl vinyl sulfone is recovered by recrystallization from chloroform-petroleum ether. The purified crystals melt to a colorless oil at 57° C.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of preparing vinyl sulfones which comprises subjecting material from the group consisting of beta-hydroxyethyl sulfones and alkanoic esters thereof, to heat decomposition between 150° C. and 600° C.

2. The method of preparing vinyl sulfones which comprises subjecting material from the group consisting of beta-hydroxyethyl sulfones and alkanoic esters thereof, to heat decomposition between 150° C. and 600° C. and between 1 and 100 mm. of mercury pressure.

3. The method of preparing vinyl sulfones which comprises subjecting a beta-hydroxyethyl sulfone to heat decomposition between 150° C. and 600° C.

4. The method of preparing vinyl sulfones which comprises subjecting a beta-hydroxyethyl sulfone to heat decomposition between 150° C. and 600° C., and between 1 and 100 mm. of mercury pressure.

5. The method of preparing vinyl sulfones which comprises subjecting an alkanoic ester of a beta-hydroxyethyl sulfone to heat decomposition between 150° C. and 600° C.

6. The method of preparing vinyl sulfones which comprises subjecting an alkanoic ester of a beta-hydroxyethyl sulfone to heat decomposition between 150° C. and 600° C., and between 1 and 100 mm. of mercury pressure.

7. The method of preparing vinyl sulfone which comprises subjecting bis(beta-hydroxyethyl) sulfone to heat decomposition between 150° C. and 600° C.

8. The method of preparing vinyl sulfone which comprises subjecting bis(beta-hydroxyethyl) sulfone to heat decomposition between 150° C. and 600° C., and between 1 and 100 mm. of mercury pressure.

9. The method of preparing vinyl sulfone which comprises subjecting bis(beta-acetoxyethyl) sulfone to heat decomposition between 150° C. and 600° C.

10. The method of preparing vinyl sulfone which comprises subjecting bis(beta-acetoxyethyl) sulfone to heat decomposition between 150° C. and 600° C., and between 1 and 100 mm. of mercury pressure.

DWIGHT L. SCHOENE.

REFERENCES CITED

The following references are of record in the file of this patent:

Chem. Abs. (1930) 24: 4257 and 4258.